United States Patent
Floeder et al.

(10) Patent No.: US 9,003,238 B2
(45) Date of Patent: Apr. 7, 2015

(54) SYSTEMS AND METHODS FOR ERROR SIMULATION AND CODE TESTING

(71) Applicant: Compellent Technologies, Eden Prairie, MN (US)

(72) Inventors: Anthony J. Floeder, St. Anthony, MN (US); Lawrence A. Dean, Vadnais Heights, MN (US)

(73) Assignee: Compellent Technologies, Eden Prairie, MN (US)

( * ) Notice: Subject to any disclaimer, the term of this patent is extended or adjusted under 35 U.S.C. 154(b) by 160 days.

(21) Appl. No.: 13/706,706

(22) Filed: Dec. 6, 2012

(65) Prior Publication Data
US 2014/0164835 A1  Jun. 12, 2014

(51) Int. Cl.
*G06F 11/00* (2006.01)
*G06F 11/36* (2006.01)

(52) U.S. Cl.
CPC .................... *G06F 11/3672* (2013.01)

(58) Field of Classification Search
CPC ............ G06F 11/2205; G06F 11/2257; G06F 11/261; G06F 11/263; G06F 11/3672
USPC ......................................... 714/41; 703/21, 22
See application file for complete search history.

(56) References Cited

U.S. PATENT DOCUMENTS

| | | | | |
|---|---|---|---|---|
| 7,610,515 B2 * | 10/2009 | Kosuge et al. | | 714/41 |
| 7,613,945 B2 | 11/2009 | Soran et al. | | |
| 7,620,851 B1 * | 11/2009 | Leavy et al. | | 714/41 |
| 8,190,983 B2 * | 5/2012 | Stenfort | | 714/807 |
| 8,489,935 B2 * | 7/2013 | Jibbe et al. | | 714/41 |
| 8,707,104 B1 * | 4/2014 | Jean | | 714/41 |
| 2003/0172321 A1 * | 9/2003 | Wolin et al. | | 714/41 |
| 2006/0112307 A1 * | 5/2006 | Marisetty et al. | | 714/11 |
| 2007/0050686 A1 * | 3/2007 | Keeton et al. | | 714/48 |
| 2007/0271082 A1 * | 11/2007 | Dominguez et al. | | 703/20 |
| 2008/0163005 A1 * | 7/2008 | Sonksen et al. | | 714/41 |

* cited by examiner

*Primary Examiner* — Marc Duncan
(74) *Attorney, Agent, or Firm* — Winthrop & Weinstine, P.A.

(57) ABSTRACT

A method for error simulation in a data storage subsystem providing abstractions of one or more storage devices. The method includes dividing the data storage subsystem into two or more hierarchically organized subsystems, wherein the subsystems interact using IO Request Packets (IORPs), such that relatively higher level subsystems create and populate IORPs and pass them to relatively lower level subsystems for corresponding processing. The method further includes defining an IORP modifier configured to attach to matching IORPs based on one or more attributes of the IORP modifier and to modify at least one of the processing and one or more attributes of the IORP in order to simulate errors in the data storage subsystem.

18 Claims, 3 Drawing Sheets

SYSTEMS AND METHODS FOR ERROR SIMULATION AND CODE TESTING

FIELD OF THE INVENTION

The present disclosure generally relates to systems and methods for error simulation and code testing. Particularly, the present disclosure relates to improved systems and methods for error simulation and code testing by introducing IORP Modifiers to the IORP paradigm for processing input/output (IO) in a data storage subsystem or other information handling system.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

When such systems increase in complexity, the responsibilities may be partitioned into more manageable pieces using a hierarchical set of subsystems. These subsystems may be constructed such that each subsystem provides a service to one or more higher level subsystems and builds on the services provided by one or more lower level subsystems effectively forming a software stack of subsystems.

Testing of systems has traditionally been carried out in two ways: manipulating external data; and using a debugger, stopping the code, and manipulating the data during runtime. Such traditional testing may be suitable for testing normal system operations. However, testing error conditions introduced in varying levels of a hierarchical system is difficult using traditional error simulation because the generation of errors in a multiple hierarchy architecture is difficult to control and may vary with each level's device type.

Thus, there is a need in the art for better simulation of failure conditions within a system of hierarchical subsystems. More particularly, there is a need in the art for, better simulation of failure conditions within a system of hierarchical subsystems by adding an additional function, referred to herein as an IORP Modifier, to the IORP paradigm for processing IO.

BRIEF SUMMARY OF THE INVENTION

The present disclosure, in one embodiment, relates to a method for error simulation in a data storage subsystem providing abstractions of one or more storage devices. The method includes dividing the data storage subsystem into two or more hierarchically organized subsystems, wherein the subsystems interact using IO Request Packets (IORPs), such that relatively higher level subsystems create and populate IORPs and pass them to relatively lower level subsystems for corresponding processing. The method further includes defining an IORP modifier configured to attach to matching IORPs based on one or more attributes of the IORP modifier and to modify at least one of the processing and one or more attributes of the IORP in order to simulate errors in the data storage subsystem. In some embodiments, the IORP modifier may be configured to modify the IORP such that it returns an immediate failure. In other embodiments, the IORP modifier may be configured to modify the IORP such that it returns a failure after delay. In still further embodiments, the IORP modifier may be configured to modify the IORP such that it is delayed prior to forwarding to a relatively lower level subsystem. In such cases, the IORP modifier may be further configured to modify the IORP such that it returns a failure. The IORP modifier may include an attribute specifying a region of interest for which it applies, the region of interest defining an address range of data blocks and/or an attribute specifying a top level subsystem, wherein the IORP modifier attaches to IORPs only sourcing from the specified top level subsystem. The IORP modifier may also include an attribute specifying an IORP request type that triggers action by the IORP modifier. In embodiments with a IORP modifier configured to delay the IORP, the IORP modifier may include an attribute specifying a length in time relating to how long the IORP modifier delays the IORP. It may also be desirable that the IORP modifier include one or more attributes specifying a recurrence pattern and rate defining how often the triggered action may recur.

The present disclosure, in another embodiment, relates to an information handling system. The information handling system may include a data storage subsystem providing abstractions of one or more storage devices, the data storage subsystem divided into two or more hierarchically organized subsystems, wherein the subsystems interact using IO Request Packets (IORPs). The system may also include an IORP modifier configured to attach to matching IORPs passed between the subsystems and modify at least one of the processing and one or more attributes of the IORP in order to simulate errors in the data storage subsystem. In some embodiments, the system may include a plurality of IORP modifiers and further include an IORP modifier interface providing access to at least one of create, modify, and delete an IORP modifier. The IORP modifier may include an attribute specifying a region of interest for which it applies, the region of interest defining an address range of data blocks. In this regard, the information handling system may include a searchable data structure for maintaining the plurality of IORP modifiers, which in some cases may be a red-black tree wherein the key for each node in the tree is a data block address range over which an IORP modifier is operative. In additional embodiments, the IORP modifier may also include an attribute specifying an IORP request type that triggers action by the IORP modifier. Similarly, the IORP modifier further comprises an attribute specifying an IORP request type that disables action by the IORP modifier regardless of other matching criteria.

The present disclosure, in yet another embodiment, relates to a method for error simulation in a data storage subsystem providing abstractions of one or more storage devices. The method may include providing a data storage subsystem divided into two or more hierarchically organized subsystems, wherein the subsystems interact using IO Request Packets (IORPs); matching an IORP modifier with an IORP based on one or more attributes defined for the IORP modifier; and modifying at least one of the IORP and the manner in which the IORP is processed in order to simulate errors in the data storage subsystem. The IORP modifier may include a region of interest attribute specifying a region of interest for which it applies, the region of interest defining a data block address range, and a request type attribute specifying an IORP request type that triggers action by the IORP modifier. In this regard, matching an IORP modifier with an IORP may include determining a match when a block address range of the IORP overlaps the region of interest of the IORP modifier for at least one data block and the request type of the IORP matches that of the request type attribute of the IORP modifier.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure relates to novel and advantageous systems and methods for error simulation and code testing. Particularly, the present disclosure relates to novel and advantageous systems and methods for error simulation and code testing by introducing IORP Modifiers to the IORP paradigm for processing IO in a data storage subsystem or other information handling system.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

While the various embodiments are not limited to any particular type of information handling system, the systems and methods of the present disclosure may be particularly useful in the context of a data storage system, or virtual disk drive system, such as that described in U.S. Pat. No. 7,613,945, titled "Virtual Disk Drive System and Method," issued Nov. 3, 2009, the entirety of which is hereby incorporated herein by reference. Such data storage systems allow the efficient storage of data by dynamically allocating user data across a page pool of storage, or a matrix of disk storage blocks, and a plurality of disk drives based on, for example, RAID-to-disk mapping. In general, dynamic allocation presents a virtual disk device or volume to user servers. To the server, the volume acts the same as conventional storage, such as a disk drive, yet provides a storage abstraction of multiple storage devices, such as RAID devices, to create a dynamically sizeable storage device. Data progression may be utilized in such data storage systems to move data gradually to storage space of appropriate overall cost for the data, depending on, for example but not limited to, the data type or access patterns for the data. In general, data progression may determine the cost of storage in the data storage system considering, for example, the monetary cost of the physical storage devices, the efficiency of the physical storage devices, and/or the RAID level of logical storage devices. Based on these determinations, data progression may move data accordingly such that data is stored on the most appropriate cost storage available. In addition, such data storage systems may protect data from, for example, system failures or virus attacks by automatically generating and storing snapshots or point-in-time copies of the system or matrix of disk storage blocks at, for example, predetermined time intervals, user configured dynamic time stamps, such as, every few minutes or hours, etc., or at times directed by the server. These time-stamped snapshots permit the recovery of data from a previous point in time prior to the system failure, thereby restoring the system as it existed at that time. These snapshots or point-in-time copies may also be used by the system or system users for other purposes, such as but not limited to, testing, while the main storage can remain operational. Generally, using snapshot capabilities, a user may view the state of a storage system as it existed in a prior point in time.

Figure 1:
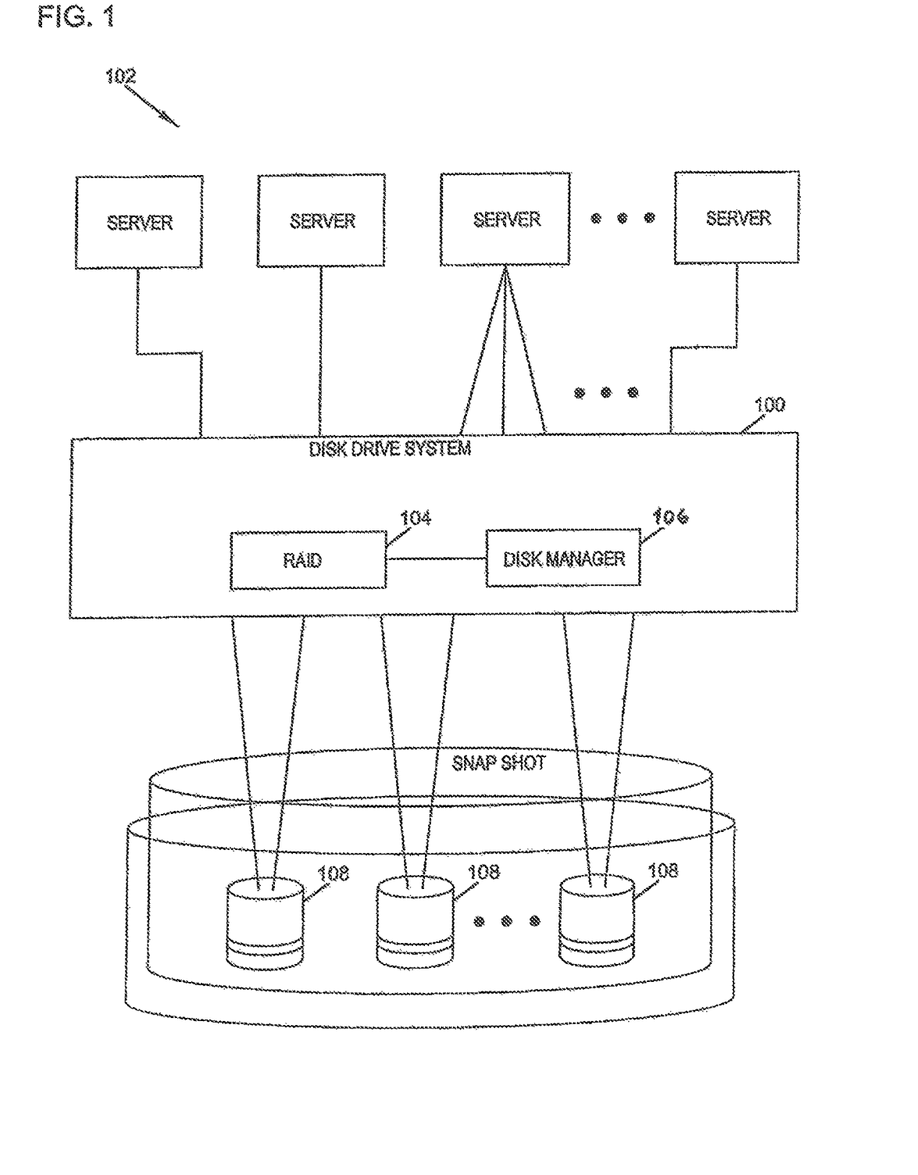
FIG. 1 is a schematic of a disk drive system suitable with the various embodiments of the present disclosure.

FIG. 1 illustrates one embodiment of a disk drive or data storage system 100 in an information handling system environment 102, such as that disclosed in U.S. Pat. No. 7,613,945, and suitable with the various embodiments of the present disclosure. As shown in FIG. 1, the data storage system 100 may include a data storage subsystem 104, which may include a RAID subsystem, as will be appreciated by those skilled in the art, and a disk manager 106 having at least one disk storage system controller. The data storage subsystem 104 and disk manager 106 can dynamically allocate data across disk space of a plurality of disk drives 108 based on, for example, RAID-to-disk mapping or other storage mapping technique.

The present disclosure relates to, and improves upon, error simulation and testing for data storage systems or other information handling systems, such as but not limited to the type of data storage system described in U.S. Pat. No. 7,613,945. Particularly, the present disclosure relates to systems and methods for error simulation and code testing by introducing IORP Modifiers to the IORP paradigm for processing IO in a data storage subsystem or other information handling system. The disclosed improvements can generally permit testing of, and the recreation of failure scenarios in, a data storage system, information handling system, or other device or software product, at a highly accelerated rate, which leads to overall development efficiencies.

In general, a data storage system, such as that described in U.S. Pat. No. 7,613,945, for example, can comprise a complex software system that provides storage abstractions of one or more random access memory devices. These storage abstractions are often referred to as volumes or virtual volumes. Volumes can perform various storage commands including, Read, Write, and WriteMultiple, for example. Each of these commands typically includes a starting address, a number of blocks over which to operate, along with a Scatter-Gather List (SGList) that maps the payload memory. A volume carries out each command, delivers read data if the command is Read, and returns a response code that indicates the result of the operation.

In order to partition the responsibilities of a data storage system into manageable pieces, a hierarchical set of subsystems, or Input/Output subsystems (IOSubsystems) may be constructed such that each IOSubsystem provides a service to one or more higher level IOSubsystems and builds on the services provided by one or more lower level IOSubsystems effectively forming a software stack of IOSubsystems. Each IOSubsystem may provide a set of devices, referred to herein as IOPath devices or simply IOPaths, that can provide generally the same commands as that of a volume. Segregating responsibilities into the various IOSubsystems can discourage duplication of function and conveniently permits concurrent development on each subsystem without affecting other subsystems, as long as the responsibilities of a subsystem are generally consistent between development versions.

IOSubsystems may participate in the standard IO Request Packet (IORP) paradigm for IO processing, i.e., they may all create and populate IORPs and pass them to lower level IOSubsystems to perform the corresponding subsystem processing. More specifically, the IORP paradigm may mimic the interface of a common storage device and serve as the interface between IOPaths within the system. IOPaths may interact using IORP objects, or simply IORPs, to pass information to, and receive data and status from, lower level IOPaths. Details of an IORP may include, but are not necessarily limited to: the request type, e.g., Read, Write, WriteVerify, WriteMultiple; the starting block address; the number of blocks; and a pointer to a SGList, which chains together discontinuous chunks of payload memory. Upon receipt of an IORP, an IOPath may either change roles becoming an IO Requestor for the next IOSubsystem in the hierarchy and the sequence will continue, or it may complete the requested operation without further assistance from lower level IOSubsystems.

Figure 2:
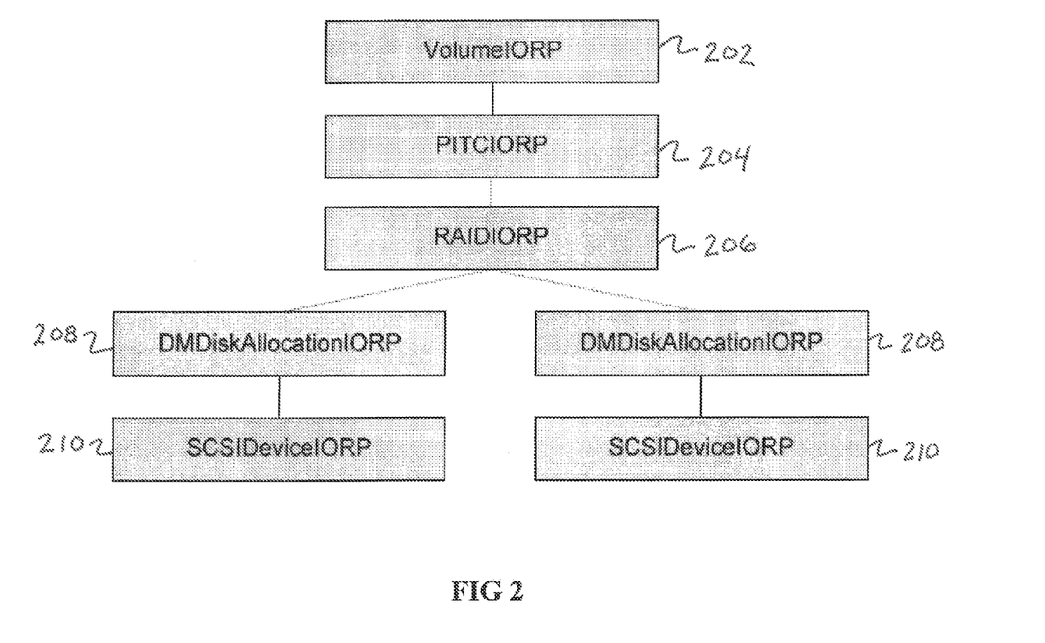
FIG. 2 is a schematic illustrating an example data path initiating at a volume subsystem level, then flowing down through a point-in-time copy (PITC) subsystem level, a RAID subsystem level, disk manager subsystem levels, and SCSI device subsystem levels.

This IORP interaction may be employed between all IOSubsystems along a data path, such as the example data path shown in FIG. 2, which illustrates a data path initiating at a volume subsystem level 202, then flowing down through a point-in-time copy (PITC) subsystem level 204, a RAID subsystem level 206, disk manager subsystem levels 208, and SCSI device subsystem levels 210. FIG. 2 particularly provides an example IORP chain for a volume write, illustrating each of the IORPs that may be generated in order to perform a volume write to, for example, a RAID device. When the IORP is created, the volume, for example, initiates the IORP chain of requests that ripple down through the lower level IOSubsystems 204, 206, 208, 210 and return back up through the IOSubsystems to return a result for the IORP. Of course, the example of FIG. 2 is provided for illustration purposes only and is not limiting. Any other IOSubsystems may be involved, and some of the IOSubsystems shown may be eliminated or replaced with other IOSubsystems. Additionally, any number of chained IOSubsystems may be included. Those shown in FIG. 2 are but one example.

A data storage system architecture, as described above, permits flexible forms of testing to validate any given IOSubsystem. Traditionally, testing code has been done in two ways: manipulating external data; and using a debugger, stopping the code, and manipulating the data during runtime. For example, using a traditional test program to inject IORPs for a particular IOPath can be effective for testing normal operations. However, testing IORP error conditions introduced by lower level IOSubsystems is difficult using traditional error simulation because the generation of errors in such a multiple hierarchy architecture is difficult to control and varies with each IOSubsystem type. Some of the weaknesses in traditional error simulation implementations in this regard include, but are not necessarily limited to:

Only one region of interest permitted per device, so testing multiple errors per IOSubsystem is virtually impossible without substantial extra effort to insert errors separately on multiple levels of IOPaths.

Only one trigger request type permitted for the region of interest, so triggering on more than one request type is not possible.

Cannot delay an IORP and then pass it through normally to the lower level IOSubsystems. Conventional delayed triggers always return an error.

Simulation attributes are not persistent, so they must be reset after a system outage, which makes them inconvenient and troublesome to use for testing outage behavior.

Do not permit triggering and disabling on the same request type.

In order to better simulate failure conditions within a data storage system, however, an additional function, referred to herein as an IORP Modifier, may be added to the IORP paradigm. An IORP Modifier, in one embodiment, may be implemented as a software object that attaches to a matching IORP in order to modify the behavior of the IORP and trigger various error handling code paths within a targeted IOPath. In contrast to the shortcomings of traditional error simulation implementations discussed above, IORP Modifiers can better simulate failure conditions in a number of ways, including but not limited to: providing a centralized interface or table for accessing IORP Modifiers; regions of interest may be determined by the blocks in a device, rather than just one region of interest per device, i.e., potentially each block could have its own IORP Modifier; multiple IORP Modifiers with differing request types may be defined within the same region of interest; a pass through mode may be provided which passes requests to a lower level IOSubsystem after optionally delaying the request; IORP Modifiers may be persistent; IORP Modifiers may have controller-specific behavior; and IORP Modifiers may be created in production level code, so they can test the production level IOPath software, which allows error and exception path testing within the production build of a data storage system without adding 'debug' code to the system.

In one embodiment, in general, modifications to a "matching" IORP that may be provided by an IORP Modifier can include, but are not limited to: returning an immediate failure; returning a failure after a delay; delaying the IORP before forwarding it to a lower level IOSubsystem; forwarding the IORP to a lower level IOSubsystem and then modifying the return status to indicate failure (similar to a request arriving at a disk, but the return status failing due to a transport problem); any of the above modifications, but specifically targeted at IORPs sourced from a particular upper level IOSubsystem. An IORP may "match" an IORP Modifier if, and in some cases only if, its block address range overlaps the region of interest of the IORP Modifier for at least one block and the request type of the IORP matches that of the IORP Modifier. Alternatively or additionally, an IORP Modifier may specify the IOSubsystem of a top-level parent IORP. If the IORP is present in the chain of IORPs attached to the specified parent IORP, a match can be declared and the IORP Modifier triggered. In one embodiment, all match and delay processing may occur within the IORP Modifier, which means that each IOPath participating in the IORP modifying paradigm, as described herein, would be modified to pass IORPs to IORP Modifiers when such modifiers are defined.

An IORP Modifier may be defined by one or more attributes specifying when or how the IORP Modifier is supposed to apply or specifying some other characteristic of the IORP Modifier. The one or more attributes may include, but are not limited to:

An attribute or attributes specifying a region of interest for which the IORP Modifier is operative by specifying, for example, a beginning block offset and a following number of blocks. As discussed above, alternatively or additionally, an IORP Modifier may include an attribute specifying a top level IOSubsystem as the source of an IORP for which it matches. If specified, IORPs sourced from the specified IOSubsystem are candidates to match the IORP Modifier. For example, if the cache subsystem is specified as the top level source of IORPs for which modification is desired, only IORPs having the cache subsystem as a top level parent IOSubsystem can be matched against the IORP Modifier. In some embodiments, for all IORPs that have the matching top level IOSubsystem, other matching criteria, such as but not limited to the region of interest and/or trigger request type (discussed below), may still be examined and/or required.

An attribute specifying a request type that triggers the IORP Modifier's action. An IORP with a matching region of interest that also specifies a request type that matches this attribute may initiate the IORP Modifier's action. Similarly, an IORP Modifier may include an attribute specifying a disable request type that disables the IORP Modifier regardless, for example, of other matching criteria. For example, an IORP with a matching region of interest that also specifies a request type matching the disable request type of the IORP Modifier disables and precludes the application of the IORP Modifier. In still further embodiments, where an IORP Modifier's trigger request type and disable request type are the same, the IORP Modifier may be configured to perform the IORP modifier operation one time, then be disabled, making it effectively a one-time modifier.

An attribute that generally enables or disables application of the IORP Modifier.

An attribute specifying a return value that is returned in a matching IORP after the IORP Modifier action has been triggered.

An attribute specifying a time delay for delaying, for the specified number of milliseconds, for example, before or after a triggered action occurs.

An attribute or attributes specifying either a blocking or pass-through action to be taken when the IORP Modifier is triggered. A blocking action may return the IORP with the IORP Modifier's return value without passing the IORP to the lower level IOSubsystems. A pass-through action may delay the IORP before passing the IORP to a lower level IOSubsystem. When the IORP Modifier is configured for a pass-through action, a further attribute may specify whether the return value specified in the IORP Modifier is returned or the actual return value as determined by the lower level IOSubsystem is returned. Delays may include delays of zero.

An attribute or attributes specifying a trigger recurrence pattern and rate. Recurrence patterns may include, but are not limited to, periodic and random. A recurrence rate may work in conjunction with the designated pattern by specifying how often the trigger may recur within the pattern. For example, a periodic recurrence pattern may trigger the IORP Modifier after encountering X matching IORPs, where X may be the specified recurrence rate. That is, the IORP Modifier trigger action may be performed when: N mod X=0, where N is the number of matching IORPs encountered. In another example, a random recurrence pattern may trigger the IORP Modifier randomly, with a likelihood of triggering on an IORP based on, for example, the value of the recurrence rate. An IORP Modifier may maintain a count of the number of matching IORPs encountered for this purpose, among others.

While many attributes have been described in detail herein, it is recognized that the above is not an exhaustive list and that any other suitable attributes may be utilized in defining an IORP Modifier or characteristics thereof. It is similarly recognized that not all of the attributes described herein are required in each embodiment, and any embodiment of an IORP Modifier may simply be defined by one or more attributes, as desired.

Figure 3:
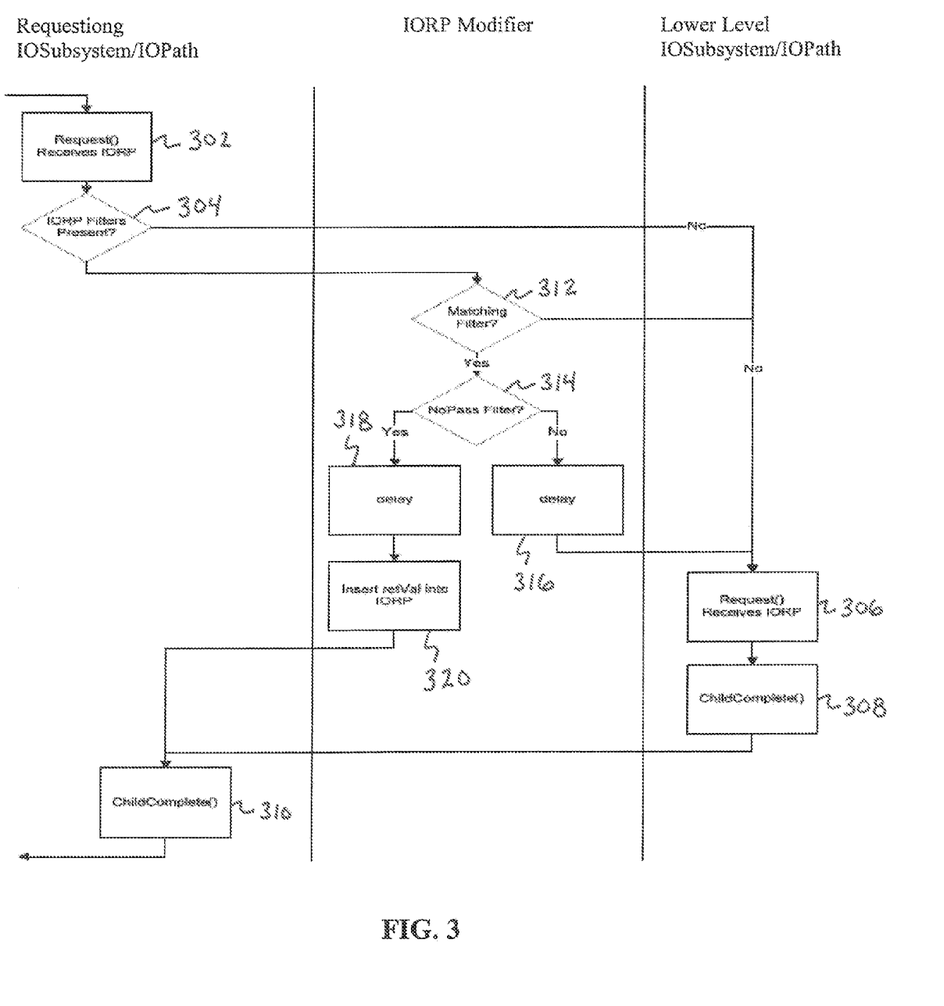
FIG. 3 is a flow diagram of the application of IORP Modifiers according to one embodiment of the present disclosure.

FIG. 3 is a flow diagram of the application of one embodiment of IORP Modifiers, as detailed herein. As shown at 302, an IORP is originated. The IORP may be created internally by the Requesting IOSubsystem or IOPath, or it may originate from an upper level IOSubsystem or IOPath. At step 304, it may be determined whether any IORP Modifiers have been defined or otherwise exist. If not, the IORP may be passed normally to the Lower Level IOSubsystem or IOPath, where it may be received 306 and processed for completion 308 normally. The result may then be returned to the Requesting IOSubsystem or IOPath, as illustrated at 310. If, however, IORP Modifiers are defined, at 312 it may be determined whether the IORP "matches" with an IORP Modifier, as described above. If not, the IORP may be passed normally to the Lower Level IOSubsystem or IOPath, where it may be received 306 and processed for completion 308 normally. If there is a matching IORP Modifier, at 314 it may be determined whether the IORP Modifier is specified as blocking (NoPass) or pass-through. If the IORP Modifier is pass through, then the IORP may be delayed at 316 before forwarding it to the Lower Level IOSubsystem or IOPath for processing 308 and return 310. In additional or alternative embodiments, the IORP may be forwarded, or delayed and forwarded, to the Lower Level IOSubsystem or IOPath, but the return status may be modified to indicate failure or modified in some other manner, as desired. If the IORP Modifier is blocking, then the IORP may be delayed at 318 and, optionally, a desired return value may be inserted into the IORP at 320. The IORP is then returned 310 to the Requesting IOSubsystem or IOPath without first being passed to the Lower Level IOSubsystem or IOPath. In alternative embodiments, the IORP may be returned to the Requesting IOSubsystem or IOPath without delay (i.e., generally immediately), with or without a return value inserted therein.

In addition to defined attributes, the IORP Modifiers may, in further embodiments, include one or more of the following characteristics or abide by one or more of the following operation rules, as desired:

- An IORP Modifier may permit late binding. That is, the IORP Modifier may exist before a matching IORP does.
- An IORP Modifier may maintain a count of the number of times it has triggered and/or the number of times it has been disabled. Similarly, an IORP Modifier may create a log entry each time it triggers or disables.
- An IORP Modifier may record the cycle time when it matches an IORP, the cycle time when it triggers on an IORP, and/or the cycle time when it disables on an IORP.
- An IORP Modifier may record a key or identifier of the IORP that triggers the modifier and/or a key or identifier of the IORP that disables the modifier.
- The performance of IOPaths for which there are no IORP Modifiers defined should desirably not be significantly degraded, and preferably not degraded at all by the inclusion of IORP Modifiers. Similarly, testing for the presence of IORP Modifiers for an IOPath should desirably not significantly impact, and preferably not impact at all, the performance of the IOPath if no Modifiers have been created for that IOPath.
- The performance of IOPaths for which IORP modifiers have been defined should also desirably be minimally impacted, and matching IORPs with IORP Modifiers would desirably be very efficient.
- IORP Modifiers with overlapping regions of interest and having the same trigger or disable request type may desirably be precluded. Otherwise, a problem may arise in determining which IORP Modifier is triggered/disabled in each case. It is recognized, however, that there may be some circumstances where such similar IORP Modifiers may be desired, and thus may be permitted.
- IORP Modifiers associated with an IOPath should desirably be deleted if the IOPath is deleted. Similarly, IORP Modifiers associated with an IOPath that doesn't exist should desirably be deleted. Generally, the existence of IORP Modifiers associated with an IOPath may follow the existence of the IOPath.
- If an IORP matches more than one IORP Modifier, a log entry listing the matching IORP Modifiers may be generated to note this occurrence. This logging may assist in identifying when multiple IORP Modifiers are defined covering a particular range of blocks for an IOPath. In one embodiment, if an IORP matches more than one IORP Modifier, any method, desirably a consistent method, of determining which IORP Modifier is applied may be utilized. For example, in one embodiment, the action defined in the IORP Modifier with the lowest matching logical block address (LBA) may be operative; however, any means may be utilized to select which IORP Modifier applies, and in some cases, more than a single IORP Modifier may be applied.

While many characteristics and operation rules have been described in detail herein, it is recognized that the above is not an exhaustive list and that any other suitable characteristics or operation rules may be defined for IORP Modifiers. It is similarly recognized that not all of the characteristics and operation rules described herein are necessary for every IORP Modifier embodiment, and any embodiment of an IORP Modifier may simply abide by none, all, or any variation therebetween of the above characteristics and operation rules, as desired.

In one embodiment, a central IORP Modifier interface or table may be provided for accessing each of the IORP Modifiers defined in the system. This central interface may be used to create, delete, and otherwise access an IORP Modifier. The interface or table may identify the values of each of the IORP Modifier attributes, and may hold any of the recorded information identified above.

Because it may be necessary to determine whether, for each or at least many IORP, a matching IORP Modifier exists, efficient searching through the IORP Modifiers may be desirable. In one embodiment, the IORP Modifiers may be maintained in a searchable data structure, such as a red-black tree with the key for each node in the tree being the address range over which the IORP Modifier is operative. For each IORP, the region of interest for the IORP may be checked to see if any IORP Modifiers have a matching region of interest, as discussed above. If an IORP Modifier with an overlapping region of interest is found, the request types of the IORP and IORP Modifier may be compared and applied or not applied accordingly.

The various embodiments of the present disclosure relating to systems and methods for error simulation and code testing provide significant advantages over conventional systems and methods for systems and methods for error simulation and code testing. For example, as discussed above, the various embodiments of the present disclosure may better simulate failure conditions in a number of ways, including but not limited to: providing a centralized interface or table for accessing IORP Modifiers; regions of interest may be determined by the blocks in a device, rather than just one region of interest per device, i.e., potentially each block could have its own IORP Modifier; multiple IORP Modifiers with differing request types may be defined within the same region of interest; a pass through mode may be provided which passes requests to a lower level IOSubsystem after optionally delaying the request; IORP Modifiers may be persistent; IORP Modifiers may have controller-specific behavior; and IORP Modifiers may be created in production level code, so they can test the production level IOPath software, which allows error and exception path testing within the production build of a data storage system without adding 'debug' code to the system. In addition, the various embodiments of the present disclosure permit driving test code through various external control paths without the use of a debugger and without stopping the program(s), to allow testing in a more natural manner. Still further, the various embodiments of the present disclosure provide an easy way to drive errors at error paths that are very difficult to hit using traditional testing methods. Accordingly, the various embodiments of the present disclosure generally permit testing of, and the recreation of failure scenarios in, a data storage system, information handling system, or other device or software product, at a highly accelerated rate, which leads to overall development efficiencies.

While described in detail with respect to a data storage system environment, it is recognized that the testing paradigm described herein is not so limited. Indeed, the various embodiments of the present disclosure may apply generally to error simulation and testing for any software/hardware environment; indeed, the benefits described above may be obtained in many areas outside of the data storage system environment.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

We claim:

1. A method for error simulation in a data storage subsystem providing abstractions of one or more storage devices, the method comprising:
    dividing the data storage subsystem into two or more hierarchically organized subsystems, wherein the subsystems interact using IO Request Packets (IORPs), such that relatively higher level subsystems create and populate IORPs and pass them to relatively lower level subsystems for corresponding processing; and
    defining an IORP modifier configured to attach to a matching IORP based on one or more attributes of the IORP modifier and to modify at least one of the processing and one or more attributes of the IORP in order to simulate errors in the data storage subsystem;
    maintaining the defined IORP modifier in a searchable red-black tree data structure maintaining a plurality of IORP modifiers, wherein a key for each node in the tree is a data block address range over which an IORP modifier is operative.

2. The method of claim 1, wherein the defined IORP modifier is configured to modify the IORP such that it returns an immediate failure.

3. The method of claim 1, wherein the defined IORP modifier is configured to modify the IORP such that it returns a failure after delay.

4. The method of claim 1, wherein the defined IORP modifier is configured to modify the IORP such that it is delayed prior to forwarding to a relatively lower level subsystem.

5. The method of claim 4, wherein the defined IORP modifier is further configured to modify the IORP such that it returns a failure.

6. The method of claim 1, wherein the defined IORP modifier comprises an attribute specifying a region of interest for which it applies, the region of interest defining an address range of data blocks.

7. The method of claim 6, wherein the defined IORP modifier further comprises an attribute specifying a top level subsystem, wherein the defined IORP modifier only attaches to an IORP sourcing from the specified top level subsystem.

8. The method of claim 6, wherein the defined IORP modifier further comprises an attribute specifying an IORP request type that triggers action by the defined IORP modifier.

9. The method of claim 8, wherein the defined IORP modifier further comprises an attribute specifying a length in time relating to how long the defined IORP modifier delays the IORP.

10. The method of claim 8, wherein the defined IORP modifier further comprises one or more attributes specifying a recurrence pattern and rate defining how often the triggered action may recur.

11. An information handling system comprising:
    a data storage subsystem providing abstractions of one or more storage devices, the data storage subsystem divided into two or more hierarchically organized subsystems, wherein the subsystems interact using IO Request Packets (IORPs);
    a plurality of IORP modifiers, each configured to attach to a matching IORP passed between the subsystems and modify at least one of the processing and one or more attributes of the IORP in order to simulate errors in the data storage subsystem; and
    a searchable red-black tree data structure for maintaining the plurality of IORP modifiers, wherein a key for each node in the tree is a data block address range over which an IORP modifier is operative.

12. The information handling system of claim 11, further comprising an IORP modifier interface providing access to at least one of create, modify, and delete an IORP modifier.

13. The information handling system of claim 12, wherein at least one of the plurality of IORP modifiers comprises an attribute specifying a region of interest for which it applies, the region of interest defining an address range of data blocks.

14. The information handling system of claim 11, wherein at least one of the plurality of IORP modifiers comprises an attribute specifying an IORP request type that triggers action by the IORP modifier.

15. The information handling system of claim 14, wherein at least one of the plurality of IORP modifiers further comprises an attribute specifying an IORP request type that disables action by the IORP modifier regardless of other matching criteria.

16. A method for error simulation in a data storage subsystem providing abstractions of one or more storage devices, the method comprising:
    providing a data storage subsystem divided into two or more hierarchically organized subsystems, wherein the subsystems interact using IO Request Packets (IORPs);
    matching an IORP modifier with an IORP based on one or more attributes defined for the IORP modifier, the IORP modifier maintained in a searchable red-black tree data structure maintaining a plurality of IORP modifiers, wherein a key for each node in the tree is a data block address range over which an IORP modifier is operative; and
    modifying at least one of the IORP and the manner in which the IORP is processed in order to simulate errors in the data storage subsystem.

17. The method of claim 16, wherein each of plurality of IORP modifiers comprises:
    a region of interest attribute specifying a region of interest for which it applies, the region of interest defining a data block address range; and
    a request type attribute specifying an IORP request type that triggers action by the IORP modifier.

18. The method of claim 17, wherein matching an IORP modifier with an IORP comprises determining a match when a block address range of the IORP overlaps the region of interest of a particular IORP modifier maintained in the red-black tree data structure for at least one data block and the request type of the IORP matches that of the request type attribute of the particular IORP modifier.

* * * * *

UNITED STATES PATENT AND TRADEMARK OFFICE
CERTIFICATE OF CORRECTION

Page 1 of 1

PATENT NO.        : 9,003,238 B2
APPLICATION NO.   : 13/706706
DATED             : April 7, 2015
INVENTOR(S)       : Anthony J. Floeder and Lawrence A. Dean It is certified that error appears in the above-identified patent and that said Letters Patent is hereby corrected as shown below:

In the Claims
Column 12, Line 51:
In Claim 17, insert --the-- between "of" and "plurality".

Signed and Sealed this
Thirteenth Day of October, 2015

Michelle K. Lee
*Director of the United States Patent and Trademark Office*